E. W. COOK.
TRACTOR.
APPLICATION FILED APR. 19, 1915.
1,168,934.
Patented Jan. 18, 1916.
3 SHEETS—SHEET 1.
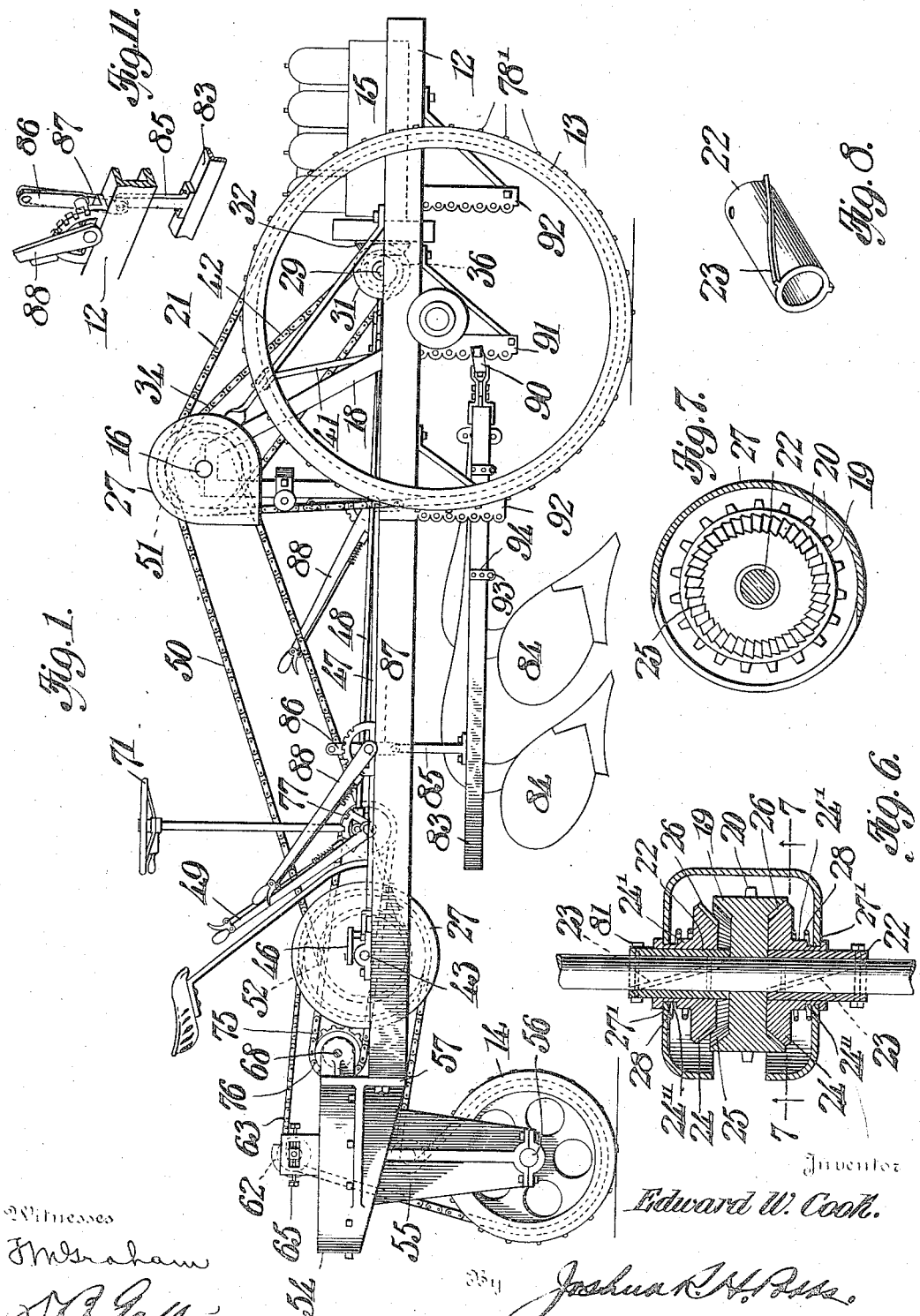
Inventor
Edward W. Cook.

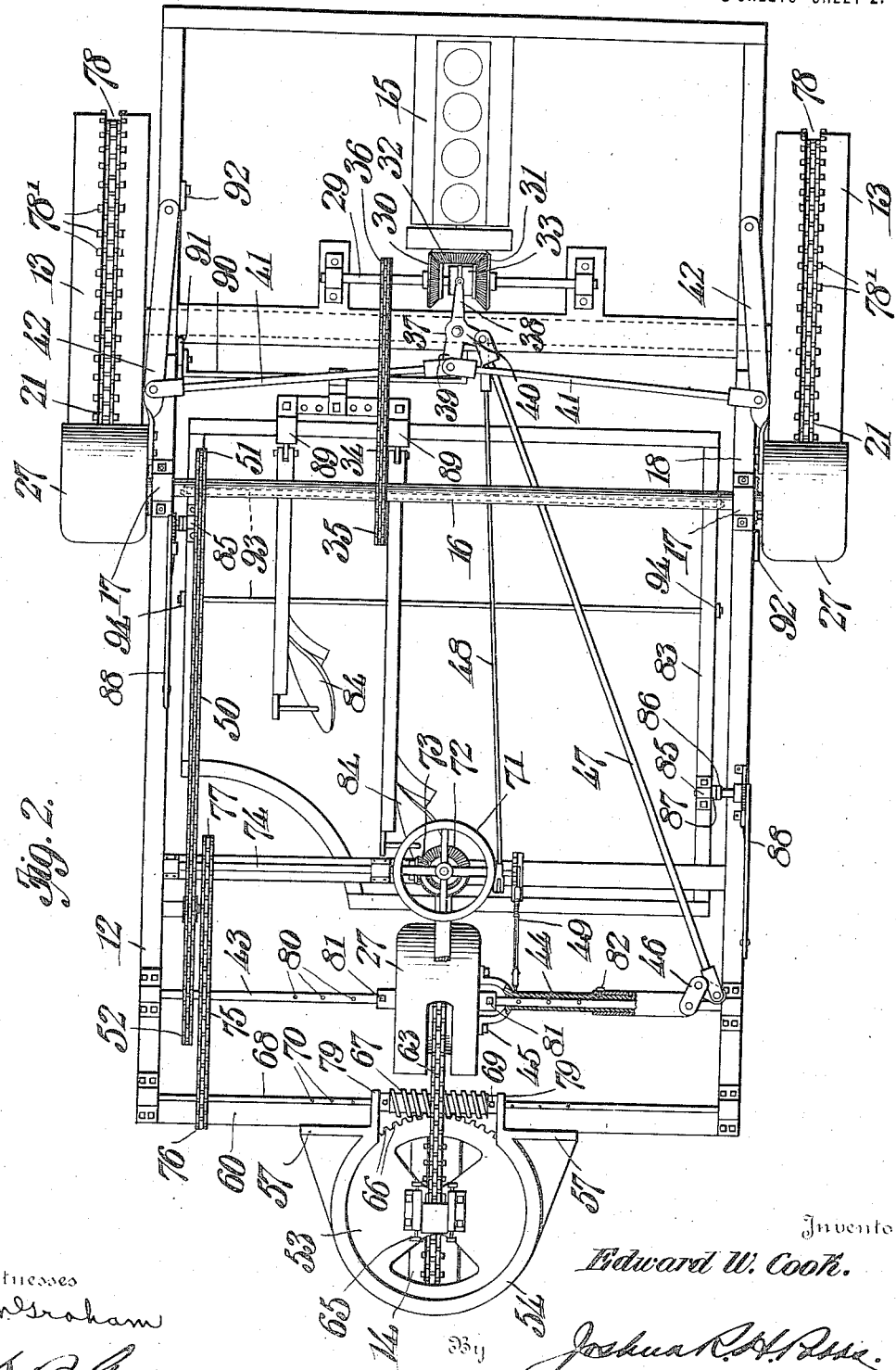

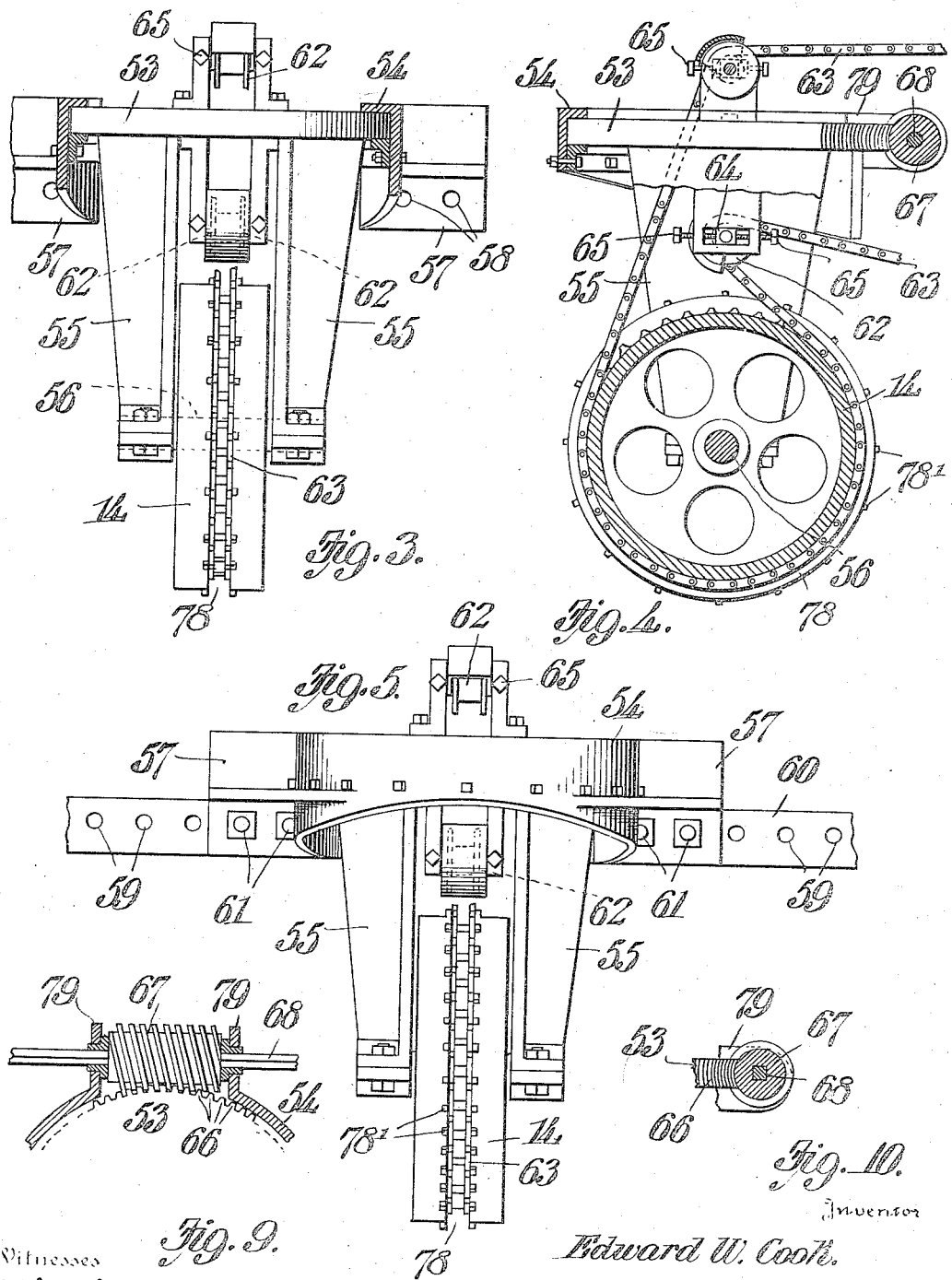

UNITED STATES PATENT OFFICE.

EDWARD W. COOK, OF GALION, OHIO.

TRACTOR.

1,168,934.  Specification of Letters Patent.  Patented Jan. 18, 1916.

Application filed April 19, 1915. Serial No. 22,341.

*To all whom it may concern:*

Be it known that I, EDWARD W. COOK, a citizen of the United States, residing at Galion, county of Crawford, and State of Ohio, have invented certain new and useful Improvements in Tractors, of which the following is a specification.

This invention relates to tractors and more particularly to tractors for operating plows, cultivators, or road scrapers, or other devices of a similar nature for land cultivation or treatment.

The primary object of the invention is to provide a tractor wherein power is imparted to all of the tractor wheels thereof, whereby the highest efficiency for devices of this character may be attained.

A further object of the invention is to provide a tractor having means for imparting power to each of the several tractor wheels thereof, wherein at a single operation the motive power connection between the motor employed with the tractor and tractor wheels may be made, severed, or reversed.

A still further object of the invention is to provide means whereby each of the supporting wheels of the tractor may be driven and wherein the racing of various of the wheels with respect to the remaining wheels may be compensated for in a simple and efficient manner.

A still further object of the invention is to provide in a tractor of the three wheel type, improved means for guiding the tractor through the third wheel and means for imparting power to the said third wheel irrespective of the fact that the wheel may be turned in various guiding positions.

A still further and particular object of the invention is to provide in a device of the above mentioned character, improved means for adjusting the guide wheel and its power imparting mechanism laterally of the tractor frame.

My invention has still further for an object to provide improved means for securing a gang of plows or cultivators, or road scraping instruments, to the tractor wherein the same may be minutely adjusted both vertically and laterally of the tractor wherein the highest degree of efficiency may be attained.

With these objects in view, together with others which will appear as the description proceeds, the invention consists in the novel combination and arrangement of parts all as will be described more fully hereinafter and particularly pointed out in the claims.

The generic characteristics are disclosed in the accompanying drawings forming a part of this specification, wherein—

Figure 1 is a side elevation of the improved tractor, Fig. 2 is a top plan view, parts broken away, of the device illustrated in Fig. 1, Fig. 3 is an enlarged detail view, partly in section, of the improved guide wheel used in connection with my tractor, Fig. 4 is a section taken at right angles to the wheel shown in Fig. 3, Fig. 5 is a rear elevation of the guide wheel showing the improved means for adjusting the same, Fig. 6 is an enlarged detail section through the improved sprocket and clutch mechanism, Fig. 7 is a section taken substantially on the line 7—7 of Fig. 6, Fig. 8 is a detail perspective view of the improved clutch supporting collar, Fig. 9 is a plan view partly in section of a fragment of a slightly modified form of steering mechanism, Fig. 10 is a fragmentary transverse section therethrough, and Fig. 11 is a detail fragmentary section of the improved means for raising and lowering the plow frame with relation to the tractor frame.

Referring now more in detail to the drawings, 12 represents generally the frame of the improved tractor which is mounted upon front wheels 13 and a rear or guide wheel 14. the type of tractor used for illustration of the present invention is that wherein three wheels are employed in support of the same, and while I have preferred to embody my invention in a tractor of this particular type, for convenience in illustration, in the present instance, it is to be understood that I do not necessarily restrict the invention to machines of this particular character, but may, by making various changes in the details, render the inventive details capable of application to tractors of various different constructions.

For the purpose of propelling the tractor thus generally referred to, a motor 15 is mounted upon the frame, preferably at the forward end thereof.

Adjacent the forward end of the frame 12 and in substantially close proximity to the periphery of the wheels 13 is a transversely extending sprocket shaft 16. This sprocket shaft is mounted in suitable bearings 17 for rotation upon a bracket or support 18. Upon each end of the shaft 16 is loosely mounted a sprocket wheel 19 the same being provided with teeth 20 over which a chain 21 is adapted to run to impart power to the adjacent drive wheel 13. This sprocket wheel and its component parts is shown more in detail in Fig. 6 of the drawing, wherein it will be readily seen that the wheel 19 is mounted for rotation upon the shaft 16 and is held against lateral movement thereon by collars 22 rigidly secured to the shaft upon each side of the said sprocket wheel. Each of the collars 22 is provided with a spiral rib 23; the ribs 23 on the collars on the opposite sides of the sprocket wheel being disposed opposite to each other, for a purpose to be detailed hereafter. Mounted for sliding movement upon each of the collars 22 is a clutch member 24. These clutch members may be provided with suitable grooves in their bore to accommodate the rib 23 upon the collar, and it will be observed that when the clutch members are moved toward and away from the sprocket wheel a decided rotary motion in one direction or the other will be imparted thereto.

The opposite faces of the sprocket wheel 19 are provided with angularly disposed clutch teeth or faces 25, the teeth on each side of the sprocket being disposed oppositely to those upon the opposite side thereof. The clutch members 24 are also provided with clutch teeth 26 for engagement with the teeth 25 of the sprocket wheel, and obviously the teeth upon the respective clutch members will be formed or inclined to correspond with those of the face of the pulley with which it is adapted to coöperate.

A housing 27 incloses the clutch members 24 and the sprocket wheel 19, and establishes connection between the opposite clutch members 24. It will be seen from Fig. 6 that movement of the housing in one direction or the other will engage one clutch member with one face of the sprocket and disengage the opposite clutch member from its respective side of the sprocket, and will hold both of the clutch members 24 out of engagement with the clutch teeth of the sprocket when the same is moved to an intermediate position. In detail, the housing 27 incloses the entire sprocket wheel and clutch members 24, the latter being each provided in an outwardly extending portion 24' thereof with an annular groove 24'' within which the inwardly extending portions 27' of the housing extend. It is to be observed that the thickness of the housing is not as great as is the width of the annular groove 24'', and thus the clutch members 24 are permitted play longitudinally of the sprocket shaft a distance sufficient to permit of the slippage of the sprocket wheel past the teeth of the clutch member 24 in the event of the sprocket traveling at a greater speed than the shaft. Expansion springs 28 are interposed between each of the clutch members 24 and the casing 27 to normally hold the said clutch members inwardly toward the sprocket wheel 19. It will be observed that movement of the housing in one direction or the other will, in advancing the clutch members, by reason of the rib 23, impart a decided rotary motion thereto, and in this manner it will be seen that a positive grip between the clutch member 24 and the adjacent faces of the sprocket 19 is insured even when the shaft 16 is rotating rapidly.

A jack shaft 29 is mounted adjacent the motor 15 upon which is loosely mounted a pair of beveled gears 30 and 31 respectively, each being in mesh at points diametrically opposite with a similar gear 32 carried by the shaft of the engine 15. A clutch member 33 is mounted to rotate with the jack shaft 29 and is capable of sliding movement thereon and may be provided in its opposite ends with conventional clutch faces for coöperation with similar faces on the gears 30 and 31, whereby it will be readily seen that upon shifting of the clutch member 33 from one of the beveled gears 30 and 31 to the other, the jack shaft 29 may be made to rotate in a forward or reverse direction. The power may be transmitted from the jack or stub shaft 29 to the sprocket shaft 16 by means of chains 34 and sprocket wheels 35 and 36 respectively.

Adjacent to the motor 15 a bracket 37 is pivoted, the same being provided with arms 38, 39 and 40, the arm 38 being connected to operate the clutch member 33 on the jack shaft 29, while the housings 27 upon the sprocket shaft 16 are operated to engage the proper clutch faces carried thereby through the medium of links 41 connected at one end to the arm 39 of the bracket, and at the opposite end to a pivoted bar 42 secured upon the frame of the tractor and supporting at each side thereof the housings 27 upon the sprocket shaft. By this arrangement it will be seen that when the bracket 37 is rocked to engage the clutch carried or controlled by the arm 38 thereof with one or the other of the gears 30 or 31 upon the jack shaft, simultaneously will the housings at opposite sides of the machine be moved to such position that the clutch members carried thereby will be engaged with the adjacent sprocket wheel properly to impart rotation from the motor 15 to the tractor wheel 13. Upon operating the clutch member 33 to neutral or to engage the opposite beveled gear, the links 41 will operate simultaneously to move the housings 27 to corresponding position.

Arranged transversely of the tractor frame at the rear thereof is a sprocket shaft 43, upon which is mounted a mechanism identical with that of the clutch member and sprocket mechanism already detailed. Upon the shaft 43 is arranged a telescopic sleeve 44, one of the sections thereof being secured as at 45 to the housing 27 inclosing the clutch mechanism; while the other section is connected at its opposite end through the medium of a bell crank mechanism 46 with a link 47, which in turn is secured to the arm 40 of the bracket 37. A link 48 is connected at one end to the arm 40 and at its opposite end to a lever 49 mounted in a position convenient to the tractor operator, whereby the direction, either forward or rearward, of the tractor may be instantly controlled, together with the simultaneous shifting of the clutches 24, upon a single operation of the hand lever 49. Rotary movement is imparted to the shaft 43 through the medium of the chain 50 and the sprocket wheels 51 and 52 secured upon the sprocket shafts 16 and 43 respectively.

Steering of the tractor is effectuated through the guide wheel 14 arranged at the rear of the tractor frame. As a means for controlling the direction of movement of the tractor a fifth wheel 53 is mounted for rotation in a bracket 54, and supports from the depending webs 55 thereof an axle 56 upon which is mounted the wheel 14. The bracket 54 is provided with outwardly extending flanges 57, each of which is provided with a plurality of openings 58 which are adapted to register with various openings 59 of a series spaced longitudinally of the transverse bar 60 of the frame 12 of the tractor. Bolts and nuts 61 are arranged through the registering openings in the bar and flanges respectively to secure the bracket in position upon the frame. By this means it will be seen that the guide wheel 14 may be shifted laterally of the tractor as desired, and the arrangement will be found most convenient where rows of crops under cultivation are of varied widths.

Idlers 62 are mounted above and below the fifth wheel to accommodate and properly feed the power chain 63 from the sprocket wheel 19 on the shaft 43 to the periphery of the guide wheel 14. As is shown more clearly in Fig. 4 of the drawings, the idlers are provided with substantially large flanges to properly accommodate and guide the chain fed therethrough, and it is also to be observed that these idlers may be employed in the capacity of chain tighteners as their boxings 64 are capable, through the adjusting screws 65, of being moved laterally of their bearings. The periphery of the fifth wheel 53 is provided as at 66 with worm teeth which are normally enmeshed with worm 67 secured to rotate with the transversely extending shaft 68. The worm 67 may be adjusted longitudinally of this shaft 68 by reason of its securing bolts 69 and the perforations or openings 70 provided in the shaft 68 spaced apart a distance equal to the distance between the openings 59 in the transverse bar 60 of the tractor frame. A steering wheel 71 is mounted at a convenient place upon the frame, and through the beveled gears 72—73 transmits power to the shaft 74, which power in turn is transmitted to the shaft 68 by means of the chain 75 and sprocket gears 76 and 77 upon the shafts 68 and 74 respectively. Therefore it is obvious that upon rotary movement of the steering wheel 71 the shaft 68 will impart to the worm 67 and the fifth wheel 53, guiding movement to the tractor wheel 14 carried by the said fifth wheel. It is also apparent that in this guiding movement the chain is properly fed from the sprocket wheel 19 to the tractor wheel 14 by the idlers 62.

In Figs. 9 and 10 of the drawing I have illustrated a slightly modified form of steering mechanism for the fifth wheel, wherein the shaft 68 is squared in cross section and the worm 67 is provided with a squared bore thus permitting of ready longitudinal movement of the worm, and while at the same time positive rotary movement is delivered to the worm through the squared shaft 68. The worm 67 may be suitably journaled in the bracket formed by the outwardly projecting arms 79 secured to the webs 57 formed upon the bracket 54. It is to be observed that in this form of power connection set screws or bolts, such as are used in the preferred embodiment of the invention, may be dispensed with.

In order to permit of adjustment of the housing and its inclosed clutch and sprocket wheel mechanism upon the sprocket shaft 43 to permit of a proper feed of the chain 63 carried thereby to the guide wheel 14, a series of openings 80 is provided in the shaft through which bolts 81 project to hold the mechanism securely in various positions of adjustment. It will thus be seen that upon lateral adjustment of the guide wheel 14, as well as the worm 67, the housing 27 may be correspondingly adjusted by withdrawing the bolts 81 extending through the sleeves or collars 22 of the clutch and sprocket mechanism to permit of sliding movement of the same to the desired position, whereupon the bolts may be readjusted to the collars 22 and the mechanism is thus securely held in adjusted position. The telescopic member 44 permits of this adjustment by removal of the securing screw 82, and upon the desired adjustment being had, the same may be replaced to connect the several sections thereof rigidly to permit of shifting movement being transmitted to the housing 27 from the link 47.

Each of the tractor wheels is provided with a peripheral depression 78 within which are located the sprocket teeth upon which the various power chains engage, and a plurality of outwardly projecting members 78' may be formed or provided upon the wheel periphery adjacent to the depression therein to prevent the power chains from becoming disengaged from the depression, and also to assist in properly guiding the same.

As an efficient means for supporting plows, cultivators or other similar instruments with which this tractor is adapted more particularly to be used, a frame 83 is provided, and upon which, for the purpose of illustration in the present instance, are mounted plows indicated generally at 84. The frame 83 is provided at opposite sides preferably with upwardly extending arm 85 which are connected to crank levers 86 by links 87, the detailed arrangement being illustrated in Fig. 11 of the drawing. By this arrangement it will be seen that rocking movement of the lever 88 will, according to the direction of movement thereof, raise or lower the frame carrying the cultivating instruments the desired distance to produce the result to be attained. The forward ends of the plows are connected by their clevises to a bracket 89 which incloses the forward transverse bar of the frame 83, and which is in turn supported, as shown at 90 in Fig. 1 of the drawings, to a clevis 91 secured rigidly to the frame of the tractor. This arrangement relieves the raising and lowering apparatus from the frame which would necessarily be imparted to the plow frame during the plowing, cultivating or road scraping operation of the device; this strain being borne entirely by the clevis 91 rigidly secured to the frame. Various other clevises or attaching devices illustrated generally at 92 may be secured or arranged at different points upon the tractor frame to permit of ready and convenient attachment of road scraping appliances or various other devices with which it is adapted that the tractor be used. Bars 93 may be secured at their opposite ends in depending ears 94 secured to the opposite sides of the plow frame 83 and upon which the plows 84 rest. This arrangement insures a stable support for the plows and also an evenness thereof at all times, and especially during the lifting operation.

I claim:—

1. In a device of the class described, a tractor comprising a frame mounted on wheels, a motor on said frame, a pair of sprocket shafts, sprocket wheels on each of said shafts, each of said tractor wheels having sprocket teeth in its periphery, chains connecting said sprocket wheels with said tractor wheels, clutches on said sprocket shafts coöperating with said sprocket wheels, means for simultaneously operating all of said clutches, and means for transmitting power from said motor to each of said sprocket shafts, substantially as described.

2. A tractor comprising a frame mounted on wheels, a motor on said frame, a jack shaft, a pair of sprocket shafts, a power connection between said sprocket shafts and each of said wheels, means for transmitting power from said motor to said sprocket shafts and to said jack shaft, a clutch on said jack shaft, and means operating simultaneously for making and breaking the power connection between said sprocket shafts and said wheels when said clutch is operated, substantially as described.

3. A tractor comprising a frame mounted on wheels, a guide wheel for said tractor and means for turning the same in various guiding positions, a motor on said frame, a sprocket shaft, means for transmitting power from said motor to said sprocket shaft, sprocket teeth on said guide wheel, a pair of idlers secured adjacent said guide wheel, and a chain passing around said guide wheel and idlers and over said sprocket wheel, substantially as described.

4. A tractor comprising a frame mounted on wheels, a motor on said frame, a sprocket shaft, a power connection between said motor and sprocket shaft, sprocket wheels loosely mounted on said shaft and provided on their opposite sides with clutch faces, clutch members secured to rotate with said shaft and capable of longitudinal movement thereon to engage or disengage said sprocket wheels, a chain connecting each sprocket wheel with one of the tractor wheels, and means for operating said clutches, substantially as described.

5. A tractor comprising a frame mounted on wheels, a motor on said frame, a sprocket shaft, a power connection between said motor and sprocket shaft, sprocket wheels loosely mounted on said shaft and provided on their opposite sides with clutch faces, clutch members secured on opposite sides of said sprocket wheels to rotate with said shaft and capable of longitudinal movement thereon to engage with or be disengaged from said sprocket wheels, a housing connecting said clutch members and inclosing the same and said sprocket wheel, a chain connecting each sprocket wheel with one of said tractor wheels, and means for moving said housing to engage said clutch members with the adjacent sprocket wheel and for simultaneously establishing, breaking or reversing said power connection, substantially as described.

6. A tractor comprising a frame mounted on wheels, a bracket secured to said frame and capable of adjustment laterally thereof, a motor on said frame, a fifth wheel mounted to rotate in said bracket, a tractor wheel secured to said fifth wheel, steering mechanism for operating said fifth wheel, a pair of idlers secured to said fifth wheel above said tractor wheel, a sprocket shaft, a driving connection between said sprocket shaft and said motor, and a power chain connecting said tractor wheel and said sprocket shaft and passing over said idlers, substantially as described.

7. A tractor comprising a frame mounted on wheels, a motor on said frame, a bracket secured to the rear of said frame and capable of lateral adjustment thereon, a fifth wheel mounted for rotary movement in said bracket, a tractor wheel mounted upon said fifth wheel, a driving connection between said motor and said tractor wheel, and means for rotating said fifth wheel, substantially as described.

8. A tractor comprising a frame mounted on wheels, a motor on said frame, a sprocket shaft, means for transmitting power from said motor to said sprocket shaft, sprockets provided on their opposite sides with clutch faces loosely mounted on said sprocket shaft, bushings rigidly secured to said shaft upon each side of each sprocket wheel, each of said bushings having a spiral rib, a clutch member provided with a bore having a groove to be engaged by said rib positioned over each bushing to slide thereon and rotate therewith, means for operating said clutch members alternately, and a chain connecting each of said sprockets and the adjacent tractor wheel, substantially as described.

9. A tractor comprising a frame mounted on wheels, a motor on said frame, a jack shaft, a beveled gear on the shaft of said motor, a pair of beveled gears loosely mounted on said jack shaft and in mesh with the first named gear at opposite points thereof, a clutch on said jack shaft for establishing or breaking connection between either of the gears thereon and said motor gear, a pair of sprocket shafts, a driving connection between said sprocket shafts and said jack shaft, sprockets loosely mounted on said shafts adjacent said tractor wheels, a connection between each of said sprocket wheels and the adjacent tractor wheels, clutch members on said sprocket shaft adapted to coöperate with said sprocket wheels to impart power thereto, and means connecting the jack shaft clutch and all of said sprocket clutch members, whereby all are operated simultaneously, substantially as described.

10. A tractor comprising a frame mounted on wheels, a motor on said frame, a bracket mounted for adjustment laterally of said frame, a fifth wheel provided in its periphery with worm teeth and mounted for rotation in said bracket, a tractor wheel carried by said fifth wheel, a shaft a worm on said shaft in engagement with the teeth on said fifth wheel, means for adjusting said worm on said shaft, means for rotating said shaft, and means for transmitting power from said motor to said tractor wheel, substantially as described.

11. A tractor comprising a frame mounted on wheels, means for propelling said tractor, a bracket at the rear of said frame, said frame being provided with a plurality of openings spaced equidistant transversely of the tractor, said bracket having flanges provided with openings adapted to register with the openings in said frame whereby said bracket may be adjusted laterally of said tractor, bolts for securing said bracket to said frame through said registering opening, a fifth wheel in said bracket and a tractor wheel secured thereto, a steering apparatus and means for transmitting power from said steering apparatus to said shaft, substantially as described.

12. A tractor comprising a frame, a motor on said frame, a sprocket shaft, a sprocket having clutch faces on its opposite sides loosely mounted on said shaft, a pair of collars on said shaft, one on each side of said sprocket, said collars each being provided with openings, said sprocket shaft being provided with a series of spaced openings adapted to register with the openings in said collars, bolts for insertion within said registered openings to hold said collars rigid to said shaft, a spiral rib on each of said collars extending longitudinally thereof and the direction of each rib being opposite to that of the rib of the adjacent collar, a clutch member provided with a groove to be engaged by said rib mounted to slide longitudinally of each of said collars, means for moving said clutch members alternately into engagement with said sprocket wheels, and a chain passing over said sprocket wheel for transmitting motion to said tractor, substantially as described.

13. A tractor comprising a frame mounted on wheels, a motor on said frame, a sprocket shaft, a sprocket wheel loosely mounted on said shaft and a chain connecting said sprocket with the adjacent tractor wheel, clutch members secured to rotate with said shaft on opposite sides of said sprocket wheel, said clutch members being slidably mounted on said shaft, the opposite sides of said sprocket wheel and the adjacent faces of said clutch members having coöperating gripping faces, a housing connecting said clutch members, a telescopic sleeve mounted on said shaft for sliding movement thereon and connected with said housing, means for holding the telescopic sections of said sleeve rigidly together, and means for imparting sliding movement to said sleeve, substantially as described.

14. A rotary shaft, a sprocket wheel provided on its opposite faces with oppositely inclined clutch faces loosely mounted on said shaft, a collar secured to rotate with said shaft on the opposite sides of said sprocket wheel, clutch members secured to slide longitudinally of said collars and to rotate therewith and provided on their adjacent faces with oppositely inclined clutch teeth for engagement with said sprocket wheel, a housing connecting said clutch members, a spring interposed between each clutch member and said housing for normally forcing said clutch members toward said sprocket wheel, and means for moving said housing to engage said clutch members alternately with said sprocket wheel, substantially as described.

15. A tractor comprising a frame mounted on wheels, one of said wheels being capable of adjustment laterally of said frame, a power driven sprocket shaft extending laterally of said frame, a sprocket on said shaft, a power connection between said sprocket and said tractor wheel, and means for adjusting said sprocket wheel on said sprocket shaft, substantially as described.

16. A tractor comprising a frame mounted on wheels, a motor on said frame, a bracket mounted for adjustment laterally of said frame, a fifth wheel rotatably mounted in said bracket, a tractor wheel connected to said fifth wheel means capable of adjustment laterally of said frame for turning said fifth wheel, a sprocket shaft, a power connection between said motor and said sprocket shaft, a sprocket on said shaft, means for adjusting said sprocket on said shaft, and a power chain connecting said sprocket wheel and said tractor, substantially as described.

17. A tractor comprising a frame mounted on wheels, a motor on said frame, one of said wheels being capable of adjustment laterally of said frame, a sprocket shaft extending laterally of said frame, a power connection between said motor and said shaft, a sprocket and coöperating clutch mounted for adjustment longitudinally of said shaft, means for operating said clutch, and a power chain connecting said sprocket and said tractor wheel, substantially as described.

18. A tractor comprising a frame mounted on wheels, a motor on said frame, a guide wheel, a sprocket on said guide wheel, a pair of idlers mounted adjacent said guide wheel and in vertical alinement with said sprocket, a sprocket shaft on said frame, a sprocket wheel on said shaft, a chain connecting said sprocket wheel and said sprocket and passing over said idlers, and a power connection between said motor and said sprocket shaft, substantially as described.

In testimony whereof I have signed my name to this specification in the presence of two subscribing witnesses.

EDWARD W. COOK.

Witnesses:
 JOHN H. COOK,
 GARDA HOLMES.